United States Patent
Mansi et al.

(10) Patent No.: US 9,251,376 B2
(45) Date of Patent: Feb. 2, 2016

(54) METHOD AND SYSTEM TO WARN THE USER IN THE EVENT OF POTENTIAL CONFIDENTIAL DOCUMENT SECURITY VIOLATIONS

(71) Applicant: International Business Machines Corporation, Armonk, NY (US)

(72) Inventors: Felice Mansi, Andria (IT); Michele Paradiso, Bari (IT); Valerio Summo, Rome (IT)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 14/081,658

(22) Filed: Nov. 15, 2013

(65) Prior Publication Data

US 2015/0143535 A1    May 21, 2015

(51) Int. Cl.
*G06F 7/04* (2006.01)
*G06F 17/30* (2006.01)
*H04N 7/16* (2011.01)
*G06F 21/64* (2013.01)

(52) U.S. Cl.
CPC ...................................... *G06F 21/64* (2013.01)

(58) Field of Classification Search
CPC ................................................. G06F 21/604
USPC .............................................................. 726/27
See application file for complete search history.

(56) References Cited

U.S. PATENT DOCUMENTS

| 8,006,093 B2* | 8/2011 | Kent et al. ..................... 713/176 |
|---|---|---|
| 8,140,664 B2 | 3/2012 | Huang et al. |
| 8,219,623 B2 | 7/2012 | Tribble et al. |
| 8,281,139 B2 | 10/2012 | Peled et al. |
| 8,286,253 B1 | 10/2012 | Lu et al. |
| 8,316,442 B2 | 11/2012 | Prahalad |
| 2002/0116542 A1* | 8/2002 | Tarbotton et al. ............. 709/318 |

(Continued)

FOREIGN PATENT DOCUMENTS

WO           01/52473         7/2001

OTHER PUBLICATIONS

CDW White Paper; Data Loss Prevention—Moving beyond perimeter security with a felxible, in-dept approach to protecting data; Retrieved from the Internet URL: http://webobjects.cdw.com/webobjects/media/pdf/Solutions/security/Data-Loss-Whitepaper.pdf; retrieved on Sep. 25, 2013; 8 pages.

(Continued)

*Primary Examiner* — Dant Shaifer Harriman
(74) *Attorney, Agent, or Firm* — Schmeiser, Olsen & Watts; John Pivnichny

(57) ABSTRACT

A method and system to warn the user in the event of potential confidential document security violations. The method includes using a computer, electronically embedding a digital marker in an electronic document to create a marked document; storing the document on a non-removable non-transitory computer readable medium of the computer; upon a request for transmission of the marked document from the computer or for copying the marked document to a removable non-transitory computer readable medium, determining that the marked document contains the digital marker and displaying a warning on a display unit of the computer of the request based on the marked document containing the digital marker; and allowing the transmission or the copying only upon approval of release of the marked document by a human user of the computer.

24 Claims, 3 Drawing Sheets

(56) References Cited

U.S. PATENT DOCUMENTS

2006/0005247 A1 1/2006 Zhang et al.
2007/0226300 A1 9/2007 Smith et al.
2012/0096257 A1* 4/2012 Li et al. .................. 713/150

OTHER PUBLICATIONS

McAFEE Data Sheet; McAfee Host Data Loss Prevention—don't bethe next big data loss media story; Retrieved from the Internet URL: http://www.mcafee.com/in/resources/data-sheets/ds-host-data-loss-prevention.pdf; retrieved on Sep. 25, 2013; 2 pages.
ACONEX Support Central; How to create confidential mail and documents; Retrieved from the Internet URL: http://help.aconex.com/support/how-create-confidential-mail-and-documents; retrieved on Sep. 25, 2013; 2 pages.
Gessiou et al.; IRILD: an Information Retrieval based method for Information Leak Detection; Seventh European Conference on Computer Network Defense (EC2ND); Sep. 6-7, 2011; 14 pages.

* cited by examiner

METHOD AND SYSTEM TO WARN THE USER IN THE EVENT OF POTENTIAL CONFIDENTIAL DOCUMENT SECURITY VIOLATIONS

TECHNICAL FIELD

The present invention relates to the field of control of electronic confidential documents. More specifically, the present invention relates to a method and system to warn the user in the event of potential confidential document security violations.

BACKGROUND

Confidential paper documents are often marked or stamped "XYZ Confidential." In the case of electronic documents, often the document simply includes "XYZ Confidential" in the header or footer of the document. In both cases a set of policies must be followed in disseminating the paper or electronic documents. The weak link in this system is control of electronic confidential documents because electronic document dissemination is subject to user distribution selection errors. Accordingly, there exists a need in the art to mitigate the deficiencies and limitations described hereinabove.

BRIEF SUMMARY

A first aspect of the present invention is a method, comprising: using a computer, electronically embedding a digital marker in an electronic document to create a marked document; storing the document on a non-removable non-transitory computer readable medium of the computer; upon a request for transmission of the marked document from the computer or for copying the marked document to a removable non-transitory computer readable medium, determining that the marked document contains the digital marker and displaying a warning on a display unit of the computer of the request based on the marked document containing the digital marker; and allowing the transmission or the copying only upon approval of release of the marked document by a human user of the computer.

A second aspect of the present invention is a computer program product, comprising: a non-transitory computer usable storage device having a computer readable program code embodied therein, the computer readable program code comprising an algorithm adapted to implement a method for warning a user of potential confidential document security violations, the method comprising the steps of: electronically embedding a digital marker in an electronic document to create a marked document; storing the document on a non-removable non-transitory computer readable medium of the computer; upon a request for transmission of the marked document from the computer or for copying the marked document to a removable non-transitory computer readable medium, determining that the marked document contains the digital marker and displaying a warning on a display unit of the computer of the request based on the marked document containing the digital marker; and allowing the transmission or the copying only upon approval of release of the marked document by a human user of the computer.

A third aspect of the present invention is a computer system comprising a processor, a memory coupled to the processor, and a computer readable storage device coupled to the processor, the storage device containing program code configured to be executed by the processor via the memory to implement a method for warning a user of potential confidential document security violations, the method comprising: electronically embedding a digital marker in an electronic document to create a marked document; storing the document on a non-removable non-transitory computer readable medium of the computer; upon a request for transmission of the marked document from the computer or for copying the marked document to a removable non-transitory computer readable medium, determining that the marked document contains the digital marker and displaying a warning on a display unit of the computer of the request based on the marked document containing the digital marker; and allowing the transmission or the copying only upon approval of release of the marked document by a human user of the computer.

These and other aspects of the invention are described below.

BRIEF DESCRIPTION OF THE DRAWINGS

The features of the invention are set forth in the appended claims. The invention itself, however, will be best understood by reference to the following detailed description of illustrative embodiments when read in conjunction with the accompanying drawings, wherein:

FIG. 2 is a flowchart of a method of controlling the release of electronic confidential documents having security markings according to the present invention; and.

DETAILED DESCRIPTION

Figure 1:
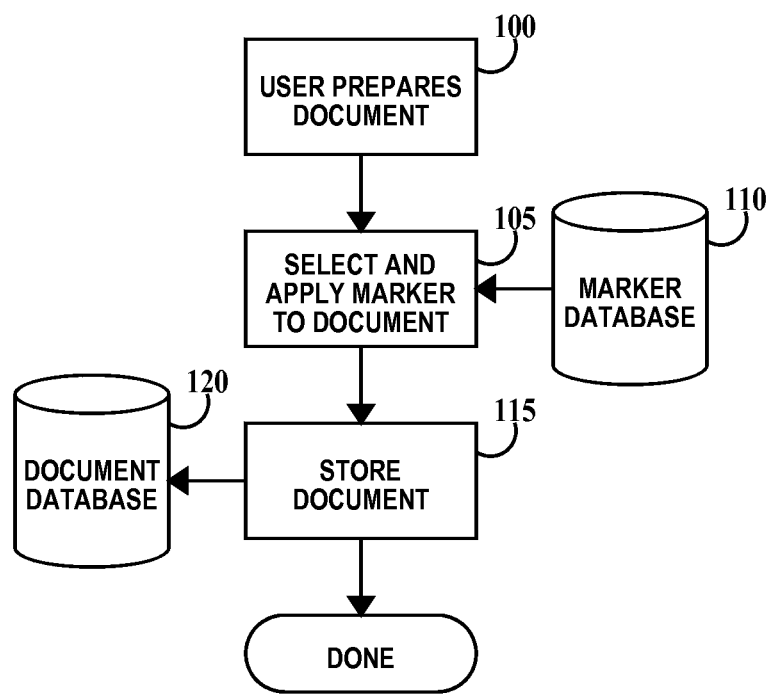
FIG. 1 is a flowchart of a method of adding digital security marks to electronic confidential documents according to the present invention.

The present invention provides a method and system of warning the user of release of electronic confidential documents by electronically embedding digital markers into the documents. The method and system uses a computer firewall to intercept outgoing data and antivirus software that also compares marker signatures as well as virus signatures and warns the user when the user has requested that a "marked" document be disseminated via copying to a removable computer readable medium, via printing or email, or via being sent electronically to an external device, system, network, intranet or the World Wide Web (i.e., Internet).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
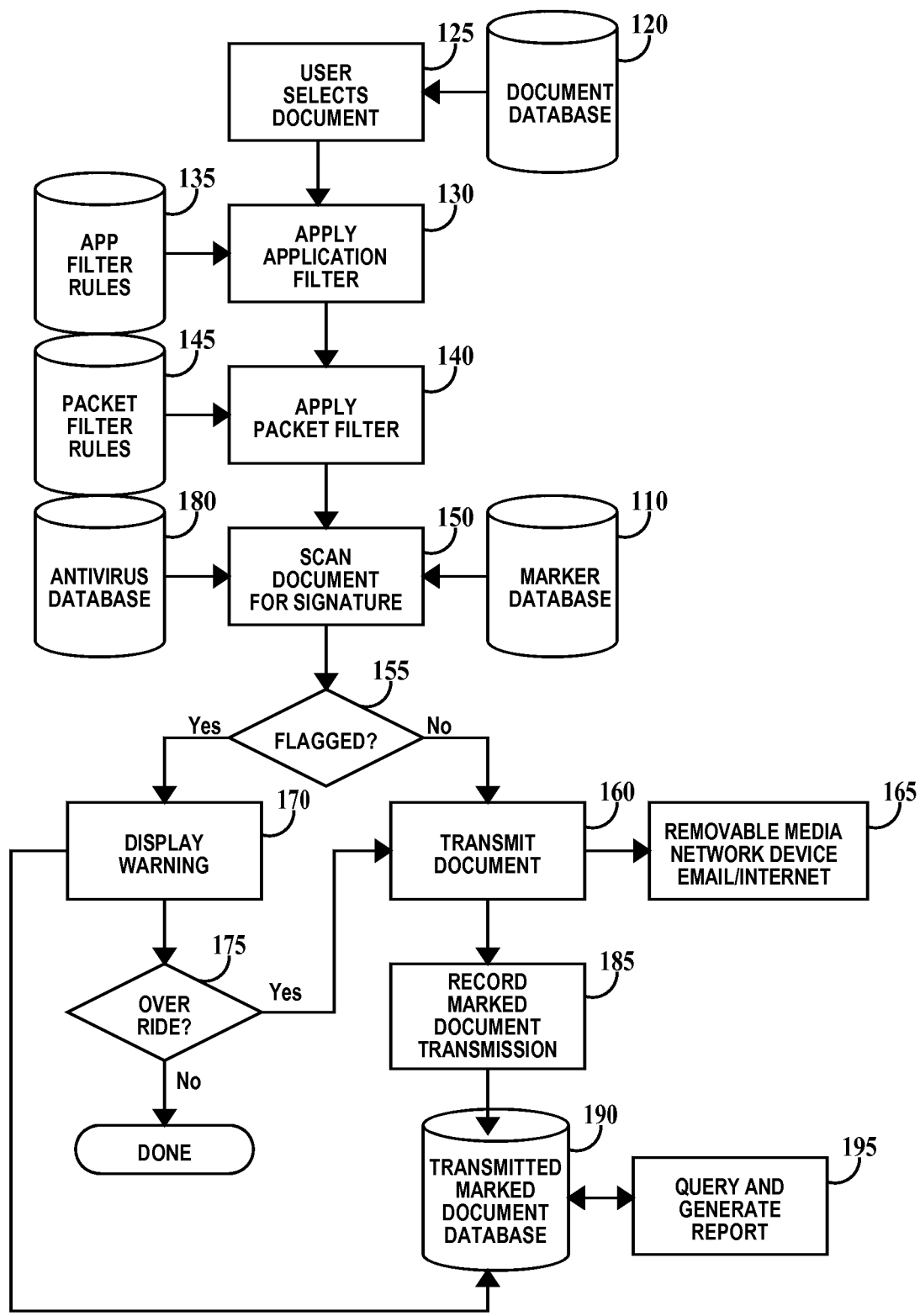

Referring now to FIGS. 1 and 2, the terms "transmit" and "transmission" include wired and wireless transmission of digital documents, printing of digital documents, and copying of digital documents to removable computer readable medium(s).

FIG. 1 is a flowchart of a method of adding digital security marks (hereinafter: markers) to electronic confidential documents according to the present invention. In step 100, a user creates or modifies an existing electronic document using a personal computer. The invention may also be applied to personal workstations connected to a server, but will be described in terms of a personal computer. Examples of electronic digital documents include, but are not limited to, word processor documents, spreadsheets, drawings, databases and other types of digital files. The document created or modified is stored on non-removable computer readable medium(s) (e.g., magnetic hard drives or internal flash drives) of the user's personal computer.

In step 105, the user selects a marker from a marker database 110 and the marker is added to the document. The user's computer or workstation displays options as to what distribution limitations are encoded by each marker. For example, some markers may trigger warnings of copying to computer readable removable storage medium(s), some markers may trigger warnings when printing is attempted and some markers may trigger warnings when email or other internet transmissions are attempted. There may be a marker that will trigger a warning of the document being released for any release of the document. In the case of emails the marker may not prompt a warning for pre-determined email addresses or the marker may prompt a warning when "reply all" instead of "reply to sender" is selected. In the case of internet sites, the marker may prompt a warning only for predetermined sites. The actual marker is a string of characters including one or more of letters, numbers and symbols found on a standard computer keyboard. It is preferred that the string of characters is one recognizable by antivirus and/or firewall software. The marker is added to the document by embedding an encoded digital data sequence representing the marker into the digital data sequence that represents the document. In one example, the fact that the document contains a marker is not displayed or otherwise evident to the user when the document is opened. Characters that do display, such as "XYZ Confidential" or "Do Not Copy" are added to the document using the application used to create the program. The marker encodes information that will generate a warning message that the user of the computer has requested a marked document to be copied to a removable computer readable medium(s) connected to the computer system (see element 230 of FIG. 3) or sent through a data port (see element 260 of FIG. 3). This is further discussed infra with reference to FIG. 2.

Figure 3:
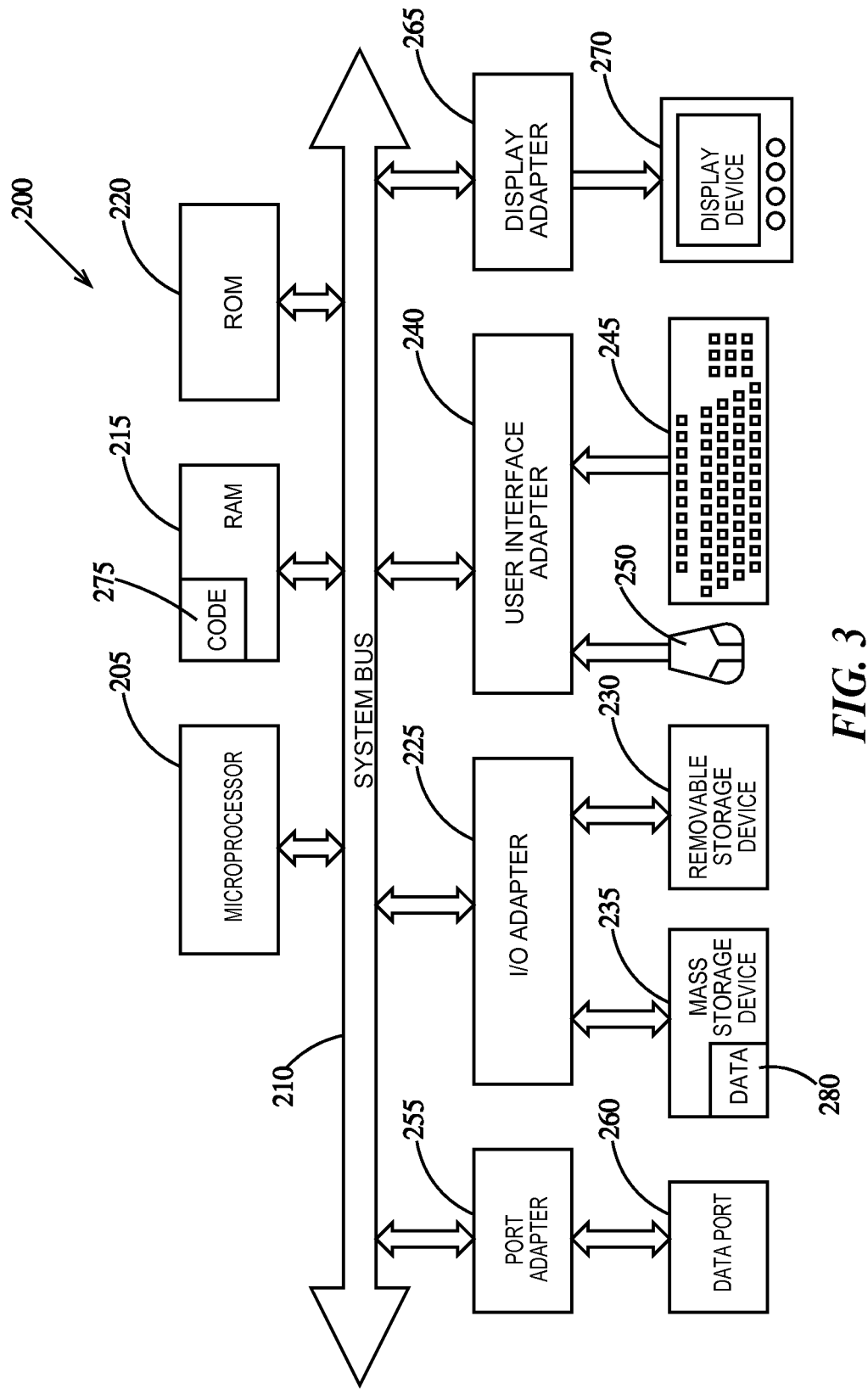
FIG. 3 is a schematic block diagram of a general-purpose computer.

In step 115, the user stores the document in a document database 120 (see element 235 of FIG. 3) stored on a physically connected, non-removable mass storage device, e.g. magnetic hard drive or internal flash memory (see element 280 of FIG. 3). Any document received, not just those created or modified by the user's personal computer may be marked before saving the received document. More than one marker may be added to the same document. In one example, the user is prompted to select a marker when the user attempts to save the document to mass storage. In one example, any existing markers are displayed to the user when the user attempts to save the document to mass storage and the user may change or remove existing markers.

FIG. 2 is a flowchart of a method of controlling the release of electronic confidential documents having security markings according to the present invention. It is important to understand that the method described in FIG. 2 does not prevent a document from being copied to removable computer storage medium(s) or transmitted electronically (e.g., to a printer, email program or internet site), but only gives a warning that copying or transmitting a marked document has been requested. Non-marked documents do not generate a warning and are sent upon request.

In step 125 a user selects a document from document database 120 to transmit. The user in FIG. 2 may or may not be the user of FIG. 1. Whether or not the user is authorized to transmit documents may be addressed by using personal computer log-on passwords supported by the computer operating system and/or document passwords supported by the application program used to create the document.

In step 130, the operating system (which has received a call to send a copy of the document selected to either a data port (see element 255 of FIG. 3) or an I/O adapter (see element 225 of FIG. 3) or otherwise send the document outside the physical confines of the user's computer applies an application filter that checks what application is making a request to send the document. Transmission or non-transmission of the document is based on application rules in application filter database 135 and not based on the presence or absence of a marker in the document. For example, one application may not be allowed to transmit data to the Internet but be allowed to transmit data to a printer or to removable computer medium(s). If the application is not allowed make the requested transmission, the operating system will display a message informing the user of the restriction and the method terminates. If the operating system determines that the application is allowed to make the requested transmission, the method moves to step 140 otherwise the method terminates and the document is not sent and an error message displayed.

In step 140 the operating system determines what document the requesting application is requesting to transmit. This check is done at packet level (using the packet headers) and examines port (as in port adapter or I/O adapter), internet protocol (ip) addresses etc. This is a performed by an application layer firewall function (hereinafter, firewall). The application layer is the seventh layer of the Open Systems Interconnection (OSI) protocol. Transmission or non-transmission of the document is based on packet filter rules in a packet filter rules database 145. For example, the packet header may contain a forbidden ip address or an address of a forbidden system. If the data packet(s) is not allowed to be transmitted, the firewall will display a message informing the user of the restriction and the method terminates. Non-allowance of a packet to be transmitted at this step is based only on packet filter rules and is not based on whether or not the document contains a marker. If the operating system determines that the data packet(s) is allowed to be transmitted, the method moves to step 150 otherwise the method terminates and the document is not sent and an error message displayed.

In step 150, using marker database 110, the document is scanned byte by byte for a marker and in step 155 it is determined if a marker has been found. If no marker is found in step 155, then in step 160, the document is allowed to be transmitted to requested internal or external networks which include remote computer systems, network printers, Internet sites and email programs or copied to removable computer readable medium(s) 165. If, in step 155, a marker is found then in step 170 a warning is displayed informing the user that the document they are requesting to be transmitted or copied to removable computer readable medium(s) is restricted. Next, in step 175 the user is asked if they want to override the warning and proceed. If the user decides to override, then the user approves release of the document and the method proceeds to step 160, if the user decides not to override then the method terminates and the document is not sent. For added security, the user may be prompted to enter a password before the user can override the warning.

Optionally, in step 150, the document may also be scanned for viruses using antivirus signature database 180 prior to scanning the document for markers.

There are several methods to implement steps 150, 155 and 170. In one example, markers from marker database 110 are added to the antivirus database 180 so step 150 uses only antivirus database 180. This allows step 150 to be performed by an antivirus application and requires the markers to be in a format readable by antivirus software (i.e., in the same format as virus signature definitions). In one example, step 150 is performed by an antivirus application with a modification to the antivirus engine to also scan the marker definitions in marker database 110. This requires the markers to be in a format readable by antivirus software (i.e., in the same format as virus definitions). In one example, steps 150, 155 and 170 are performed by an antivirus application with a modification to the antivirus engine to also scan the marker definitions in marker database 110. This further requires the markers to include the message to be displayed and a modification to override any automatic virus removal functions. In one example, steps 150, 155 and 170 are performed by an antivirus application with markers from marker database 110 added to antivirus database 180. When using an antivirus program to scan for markers, the markers include the message to be displayed and the antivirus program is modified to override any automatic virus removal functions and call an applet that displays the warning screen.

Optionally, after transmittal of the document in step 160, then in step 185, if the document contained a marker and was transmitted, the document (or at least the document name), type of marker, type of transmission (e.g., email, internet, external computer, network printing and date and time of transmission are recorded in a transmitted marked document database 190. In step 195, a query and report of marked documents transmitted is generated.

The flowchart and block diagrams in FIGS. 1 and 2 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Generally, the method described herein with respect to a method and system to warn the user in the event of potential confidential document security violations is practiced with a general-purpose computer and the methods described supra in the flow diagrams of FIGS. 1 and 2 may be coded as a set of instructions on removable or hard medium(s) for use by the general-purpose computer.

FIG. 3 is a schematic block diagram of a general-purpose computer. In FIG. 3, computer system 200 has at least one microprocessor or central processing unit (CPU) 205. CPU 205 is interconnected via a system bus 210 to a random access memory (RAM) 215, a read-only memory (ROM) 220, an input/output (I/O) adapter 225 for connecting a removable data and/or program storage device 230 and a mass data and/or program storage device 235, a user interface adapter 240 for connecting a keyboard 245 and a mouse 250, a port adapter 255 for connecting a data port 260 and a display adapter 265 for connecting a display device 270. RAM 235 includes code 275 for storing application software and other software and mass storage device 235 includes document and file storage data 280 which includes documents and databases created by the user or software applications.

ROM 220 contains the basic operating system for computer system 200. The operating system may alternatively reside in RAM 215 or elsewhere as is known in the art. Examples of removable data and/or program storage device 230 include magnetic medium(s) such as floppy drives and tape drives and optical medium(s) such as CD ROM drives. Examples of mass data and/or program storage device 235 include electronic, magnetic, optical, electromagnetic, infra-red, and semiconductor devices. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. In addition to keyboard 245 and mouse 250, other user input devices such as trackballs, writing tablets, pressure pads, microphones, light pens and position-sensing screen displays may be connected to user interface 240. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for the computer program created to run the present invention is loaded on the appropriate removable data and/or program storage device 230, fed through data port 260 or typed in using keyboard 245.

Thus, the embodiments of the present invention provide a method and system to warn the user in the event of potential confidential document security violations.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for controlling release of electronic documents, comprising:
   selecting an electronic document from a document database stored in a first memory location;
   selecting a digital marker from a marker database stored in a second memory location;
   using a processor, electronically embedding, said digital marker in said electronic document to generate a marked document;
   storing said marked document in said document database;
   upon receiving a request for transmission of a requested document from said document database to (i) an external device or the Internet, (ii) a removable non-transitory memory device or (iii) a printer determining whether said requested document is a marked document and based on said determining displaying a warning on a display device only if said requested document is a marked document;
   allowing said transmission of a requested document that is a marked document only upon approval of release of said requested marked document by a human user of said computer; and
   for each transmission of a requested document that is a marked document, recording in a transmitted marked document database stored in a third memory location at least a name of said requested document, the date and time of the release of said requested document, and to the external device or said removable non-transitory computer readable medium or printer to which said requested document was transmitted.

2. The computer-implemented method of claim 1, including:
   upon a request for transmission of a requested document from said document database, generating said warning only if said requested document contains said digital marker.

3. The computer-implemented method of claim 1, including:
   said digital marker is in the same format as an antivirus signature used by an antivirus program stored in a fourth memory location and upon said request for transmission of said requested document scanning said requested document using said antivirus program scans for said digital marker.

4. The computer-implemented method of claim 1, including:
   after said receiving said request for transmission of said requested document and before determining if said document contains said digital marker:
      determining through which application said request is being made;
      determining what document the application is attempting to transmit; and
      performing said determining if whether said requested document is a marked document only if requested document is being sent to an allowed packet address based on application filter rules.

5. The computer-implemented method of claim 1, including:
   after said receiving said request for transmission of said requested document and before determining if said requested document contains said digital marker:
      determining through which application said request is being made;
      determining what document the application is attempting to transmit; and performing said determining whether said requested document is a marked document only if said application is allowed to transmit said selected document based on packet filter rules and only if said requested document is being sent to an allowed packet address.

6. The computer-implemented method of claim 1, wherein said marked document is transmitted over the internet.

7. The computer-implemented method of claim 1, including:
said digital marker is in the same format as an antivirus signature used by an antivirus program stored in a fourth memory location and upon a request for transmission said requested document scanning said requested document using said antivirus program scans said any document for said digital marker and generating said warning only if said requested document contains said digital marker.

8. The computer-implemented method of claim 7, wherein said antivirus program generates said warning.

9. A computer program product, comprising:
a non-transitory computer usable storage device having a computer readable program code embodied therein, said computer readable program code comprising an algorithm adapted to implement a method for warning a user of potential confidential document security violations, said method comprising the steps of:
electronically embedding a digital marker selected from a document database in an electronic document selected from a document database to create a marked document;
storing said marked document in said document database;
upon a request for transmission of a requested document from said document database to (i) an external device or the Internet, (ii) a removable non-transitory computer readable memory device or (iii) a printer, determining whether said requested document is a marked document and based on said determining displaying a warning on a display device;
only if said requested document is a marked document;
allowing said transmission of a requested document by a human user of said computer; and
for each transmission of a requested document that is a marked document, recording in a transmitted marked document database stored in a third memory location at least a name of said requested document, the date and time of the release of said requested document, and to the external device or said removable non-transitory computer readable medium or printer to which said requested document was transmitted.

10. The computer program product of claim 9, the method further including wherein said marked document is transmitted over the internet.

11. The computer program product claim 9, the method further including:
said digital marker is in the same format as an antivirus signature used by an antivirus program stored in a fourth memory location and upon said request for transmission of said requested document scanning said requested document using said antivirus program scans for said digital marker.

12. The computer program product claim 9, the method further including:
said digital marker is in the same format as an antivirus signature used by an antivirus program stored in a fourth memory location and upon said request for transmission of said requested document scanning said requested document using said antivirus program scans for said digital marker.

13. The computer program product claim 9, the method further including:
after said receiving said request for transmission of said requested document and before determining if said document contains said digital marker:
determining through which application said request is being made;
determining what document the application is attempting to transmit; and
performing said determining if whether said requested document is a marked document only if requested document is being sent to an allowed packet address based on application filter rules.

14. The computer program product claim 9, the method further including:
after said receiving said request for transmission of said requested document and before determining if said requested document contains said digital marker:
determining through which application said request is being made;
determining what document the application is attempting to transmit; and
performing said determining if whether said requested document is a marked document only if said application is allowed to transmit said selected document based on packet filter rules and only if said requested document is being sent to an allowed packet address.

15. The computer program product claim 9, the method further including:
said digital marker is in the same format as an antivirus signature used by an antivirus program stored in a fourth memory location and upon a request for transmission said requested document scanning said requested document using said antivirus program scans said any document for said digital marker and generating said warning only if said requested document contains said digital marker.

16. The computer program product of claim 15, the method further including wherein said antivirus program generates said warning.

17. A computer system comprising a processor, a memory coupled to the processor, and a computer readable storage device coupled to the processor, said storage device containing program code configured to be executed by the processor via the memory to implement a method for warning a user of potential confidential document security violations, said method comprising:
a non-transitory computer usable storage device having a computer readable program code embodied therein, said computer readable program code comprising an algorithm adapted to implement a method for warning a user of potential confidential document security violations, said method comprising the steps of:
electronically embedding a digital marker selected from a document database in an electronic document selected from a document database to create a marked document;
storing said marked document in said document database;
upon a request for transmission of a requested document from said document database to (i) an external device or the Internet, (ii) a removable non-transitory computer readable memory device or (iii) a printer, determining whether said requested document is a marked document and based on said determining displaying a warning on a display device;
only if said requested document is a marked document;
allowing said transmission of a requested document by a human user of said computer; and for each transmission of a requested document that is a marked document, recording in a transmitted marked document database stored in a third memory location at least a name of said requested document, the date and time of the release of said requested document, and to the external device or said removable non-transitory computer readable medium or printer to which said requested document was transmitted.

18. The computer system of claim 17, the method further including, wherein said marked document is transmitted over the internet.

19. The computer system of claim 17, the method further including, wherein said antivirus program generates said warning.

20. The computer system of claim 17, the method further including the step of:
said digital marker is in the same format as an antivirus signature used by an antivirus program stored in a fourth memory location and upon said request for transmission of said requested document scanning said requested document using said antivirus program scans for said digital marker.

21. The computer system of claim 17, the method further including the step of:
said digital marker is in the same format as an antivirus signature used by an antivirus program stored in a fourth memory location and upon said request for transmission of said requested document scanning said requested document using said antivirus program scans for said digital marker.

22. The computer system of claim 17, the method further including the step of:
said digital marker is in the same format as an antivirus signature used by an antivirus program stored in a fourth memory location and upon a request for transmission said requested document scanning said requested document using said antivirus program scans said any document for said digital marker and generating said warning only if said requested document contains said digital marker.

23. The computer system of claim 17, the method further including the step of:
after said receiving said request for transmission of said requested document and before determining if said document contains said digital marker:
determining through which application said request is being made;
determining what document the application is attempting to transmit; and
performing said determining whether said requested document is a marked document only if requested document is being sent to an allowed packet address based on application filter rules.

24. The computer system of claim 17, the method further including the step of:
after said receiving said request for transmission of said requested document and before determining if said requested document contains said digital marker:
determining through which application said request is being made;
determining what document the application is attempting to transmit; and
performing said determining if whether said requested document is a marked document only if said application is allowed to transmit said selected document based on packet filter rules and only if said requested document is being sent to an allowed packet address.

* * * * *